United States Patent
Hsu et al.

(10) Patent No.: US 9,064,142 B2
(45) Date of Patent: Jun. 23, 2015

(54) HIGH-SPEED FINGERPRINT FEATURE IDENTIFICATION SYSTEM AND METHOD THEREOF ACCORDING TO TRIANGLE CLASSIFICATIONS

(75) Inventors: Wen-Hsing Hsu, Hsinchu (TW); Ho-Ling Hsu, Hsinchu (TW)

(73) Assignee: Wen-Hsing Hsu, Hsinchu (TW)

( * ) Notice: Subject to any disclaimer, the term of this patent is extended or adjusted under 35 U.S.C. 154(b) by 389 days.

(21) Appl. No.: 13/363,830

(22) Filed: Feb. 1, 2012

(65) Prior Publication Data

US 2012/0195478 A1    Aug. 2, 2012

(30) Foreign Application Priority Data

Feb. 1, 2011  (TW) .............. 100104071 A (51) Int. Cl.
  *G06K 9/46*    (2006.01)
  *G06K 9/00*    (2006.01)
(52) U.S. Cl.
  CPC .................. *G06K 9/00093* (2013.01)
(58) Field of Classification Search
  CPC .......... G06K 9/00026; G06K 9/00087; G06K 9/00073; G06K 9/00013; G06K 9/00067; G06K 9/00006; G06K 9/00046; G06K 9/0008; G06K 9/00093; G06F 21/32
  USPC ................................................. 382/124, 125
  See application file for complete search history.

(56) References Cited

U.S. PATENT DOCUMENTS

| | | | |
|---|---|---|---|
| 6,041,133 A * | 3/2000 | Califano et al. | 382/124 |
| 7,711,153 B2 * | 5/2010 | Hillhouse | 382/115 |
| 2005/0036664 A1 | 2/2005 | Davis | |
| 2006/0083430 A1 * | 4/2006 | Neumann et al. | 382/228 |
| 2006/0159316 A1 * | 7/2006 | Chisamore et al. | 382/125 |
| 2010/0080425 A1 * | 4/2010 | Bebis et al. | 382/125 |
| 2010/0135538 A1 * | 6/2010 | Barral | 382/115 |

FOREIGN PATENT DOCUMENTS

| | | |
|---|---|---|
| CN | 101620677 A | 1/2010 |
| CN | 101145196 B | 4/2010 |

OTHER PUBLICATIONS

A Robust Fingerprint Indexing Scheme Using Minutia Neighborhood Structure and Low-Order Delaunay Triangles Xuefeng Liang ; Bishnu, A. ; Asano, T. Information Forensics and Security, IEEE Transactions on vol. 2, Issue: 4 DOI: 10.1109/TIFS.2007.910242 Publication Year: 2007 , pp. 721- 733.*

Yang Li-Min, et al., "Pattern Matching Based on Fingerprint Classification", ACTA Electronica Sinica, journal, Jul. 2013, vol. 31 No. 7, Inst.of Image Processing and Pattern Recog,Shanghai Jiaotong Univ,Shanghai 200030,China.

Yin Yilong, et al., "Fingerprint Matching Based on Delaunay Triangulation", Journal of Computer Research and Development, journal, Jun. 14, 2005, pp. 1622-1627, vol. 9, China Academic Journal Electronic Publishing House, China.

* cited by examiner

*Primary Examiner* — Kim Vu
*Assistant Examiner* — Michael Vanchy, Jr.
(74) *Attorney, Agent, or Firm* — Muncy, Geissler, Olds & Lowe, P.C.

(57) ABSTRACT

A fingerprint feature identification system and method utilizes multiple feature points on a fingerprint to build feature triangles. Each of the feature triangles are classified as one of predetermined triangle classifications according to geometric data thereof. Every new feature triangle built from a new fingerprint is classified first and then compared with its geometric data to multiple filed feature triangles with the same triangle classification to shorten overall comparison duration.

20 Claims, 9 Drawing Sheets

HIGH-SPEED FINGERPRINT FEATURE IDENTIFICATION SYSTEM AND METHOD THEREOF ACCORDING TO TRIANGLE CLASSIFICATIONS

CROSS-REFERENCES TO RELATED APPLICATIONS

This non-provisional application claims priority under 35 U.S.C. §119(a) on Patent Application No. 100104071 filed in Taiwan, R.O.C. on 2011 Feb. 1, the entire contents of which are hereby incorporated by reference.

BACKGROUND

1. Technical Field

The disclosure relates to fingerprint identification technologies, and in particular to a high-speed fingerprint identification system and method according to triangle classifications.

2. Related Art

Generally Biometrics uses a portion of biological features on a human body to identify a person's actual identity. Commonly biometrics is applied through face identification, iris identification, vein identification and fingerprint identification. Among these biometric identification technologies, currently fingerprint identification is the broadest application in the market and also one of the easiest applications to be realized at a low cost. Since the possibility of two perfect identical human fingerprints are almost next to nothing, fingerprint identification is broadly used on criminal evidence collections from 19 century.

A fingerprint is formed by raised ridges and concave valleys surrounding each other. Combinations of ridges and valleys on a fingerprint may form various fingerprint features, such as "terminations", "bifurcation", "lake", "independent ridge", "island", "spur", "crossover" and etc. These fingerprint features may all be used as the basis of fingerprint identification. Among all the different fingerprint features, "Ridge Termination Point" and "Ridge Bifurcation Point" are the most fundamental "Standard Feature Points".

The most significant performance factors of a fingerprint identification system are search time, filtering rate and accuracy. Conventionally a fingerprint needs to be compared with multiple fingerprints during a one-to-many fingerprint identification process; namely a scanned unknown fingerprint image is directly processed with characteristic comparisons to every fingerprint feature file of all the filed fingerprints stored in a database. Such method is undoubtedly the simplest yet the most time consuming. When applied to an electrical information device (e.g. notebook computer) as a login security mechanism, since the fingerprint feature files required to be compared are relatively fewer, such direct comparison method may be sufficient to fulfill the requirements. However, when applied to building entry controls or crime investigations, since the compared fingerprint feature files are at least hundreds and thousands or even hundred thousands, the fingerprint identification efficiency of conventional one-to-many method is quite low.

In order to enhance the efficiency, high-speed fingerprint systems nowadays do not use "Standard Feature Points" to conduct direct comparison tasks; instead, additional "specific features" are adopted as well, such as Fingerprint Directions, Core Points, Delta Points and etc. These fingerprint identification systems have to additionally retrieve, identify and classify these specific features, which leading to a much more complex system framework.

SUMMARY

Accordingly, in an embodiment of the disclosure, a fingerprint feature identification system and method thereof establish multiple feature triangles for every fingerprint; according to geometric data of these feature triangles, each of the feature triangles is classified into one of predetermined filed triangle classifications. As to a new fingerprint, each of new feature triangles of the new fingerprint is firstly classified, and then the geometric data of each of the new feature triangles on the new fingerprint are compared with the filed feature triangles on each of filed fingerprints with the same triangle classification, thereby shortening the overall identification time.

In another embodiment, a fingerprint feature identification method includes the following sections. Multiple feature triangles are established according to a plurality of feature points on a fingerprint. Multiple geometric data on each of the feature triangles are respectively calculated. According to one or more of the geometric data on each of the feature triangles, the feature triangles on the fingerprint are classified into multiple triangle classifications for fingerprint identification.

In another embodiment, a fingerprint feature identification method includes the following steps. Establish multiple new feature triangles according to multiple new feature points within a new fingerprint; respectively calculate multiple new geometric data of each of the new feature triangles within the new fingerprint; according to one or more of the new geometric data of each of the new feature triangles, respectively classify the new feature triangles into one or more of multiple triangle classification; and respectively compare one or more of the new geometric data of each of the new feature triangles with multiple filed geometric data of a filed feature triangle of a filed fingerprint; wherein the compared new feature triangle and the compared filed feature triangle are previously classified as one of the same triangle classifications.

In another embodiment, a fingerprint feature identification system mainly includes a processing unit, a display unit, a database and multiple data buses. A new print is input from an external or embedded fingerprint retrieving device. The processing unit is capable of establishing multiple feature triangles according to multiple feature points within a fingerprint, respectively calculating multiple geometric data of each of the feature triangles, and respectively classifying the feature triangles of the fingerprint into at least one of multiple triangle classifications according to at least one of the geometric data of each of the feature triangles. The database is accessible by the processing unit, and capable of storing the feature points, the feature triangles and the geometric data of the fingerprint and the corresponding triangle classifications. The display unit is controllable by the processing unit, and capable of displaying the feature points, the feature triangles and the geometric data of the fingerprint and the corresponding triangle classifications. The data buses electrically connect the processing unit, the database and the display unit for data transmissions thereof.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
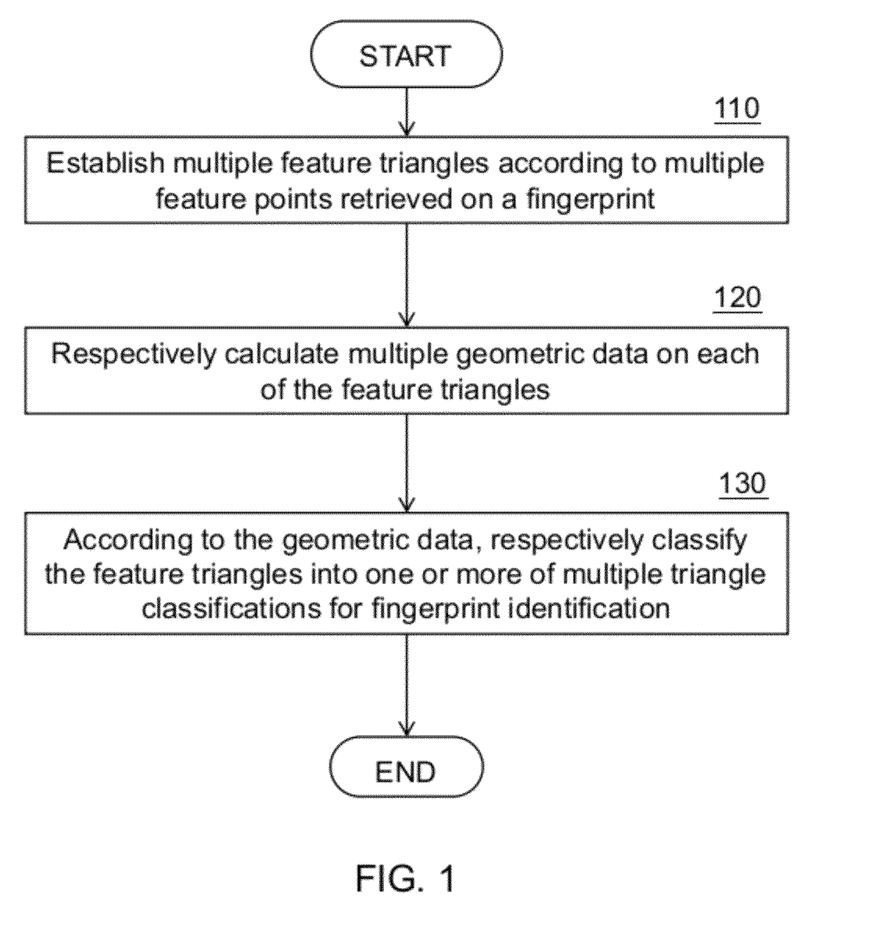
FIG. 1 is a flow chart of a fingerprint feature identification method according to an embodiment.

Refer to FIG. 1, which is a flow chart of a fingerprint feature identification method according to an embodiment. The flow chart illustrates how the fingerprint features on a fingerprint image are processed, which is an important section of the fingerprint feature identification method. As shown in FIG. 1, the fingerprint feature identification method mainly includes three steps 110, 120 and 130; please refer to detailed descriptions as follows. These steps are introduced in an example sequence, which is not a general limitation to the disclosure.

Step 110: Establish multiple feature triangles according to multiple feature points retrieved on a fingerprint.

Figure 2A:
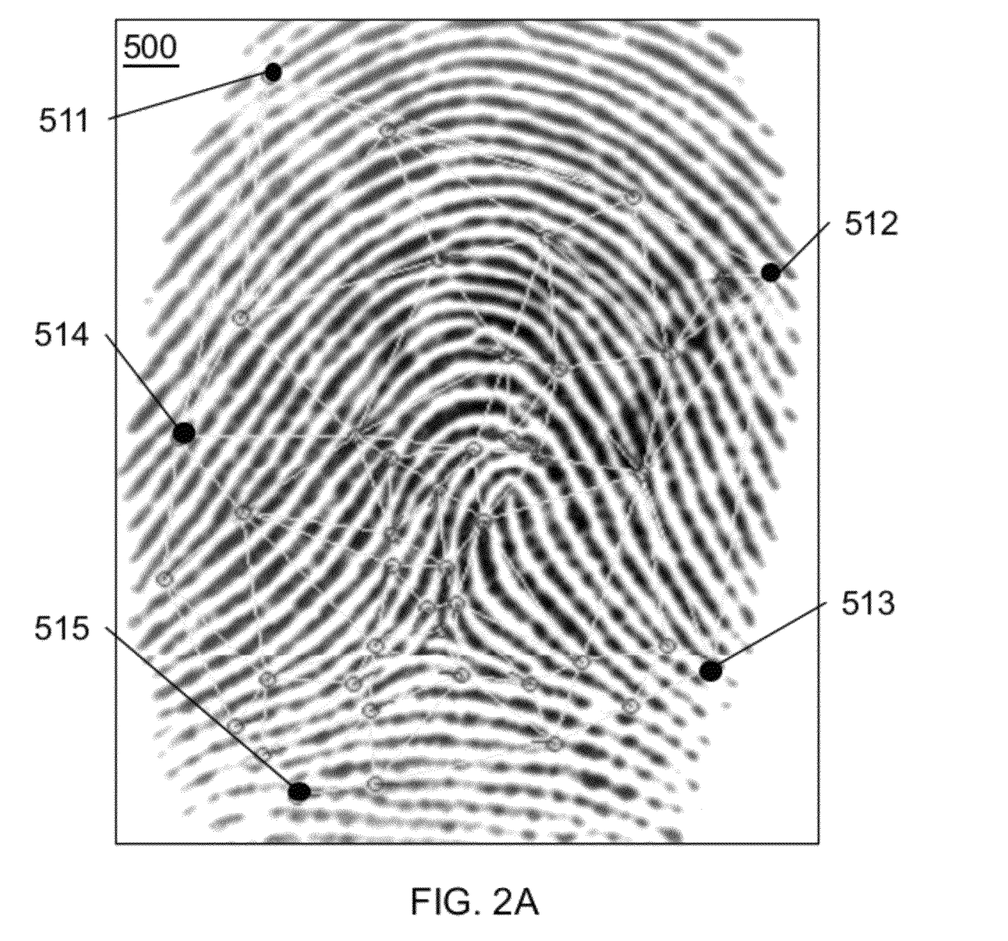
FIG. 2A is an image processed by a fingerprint feature identification method according to another embodiment.
Figure 2B:
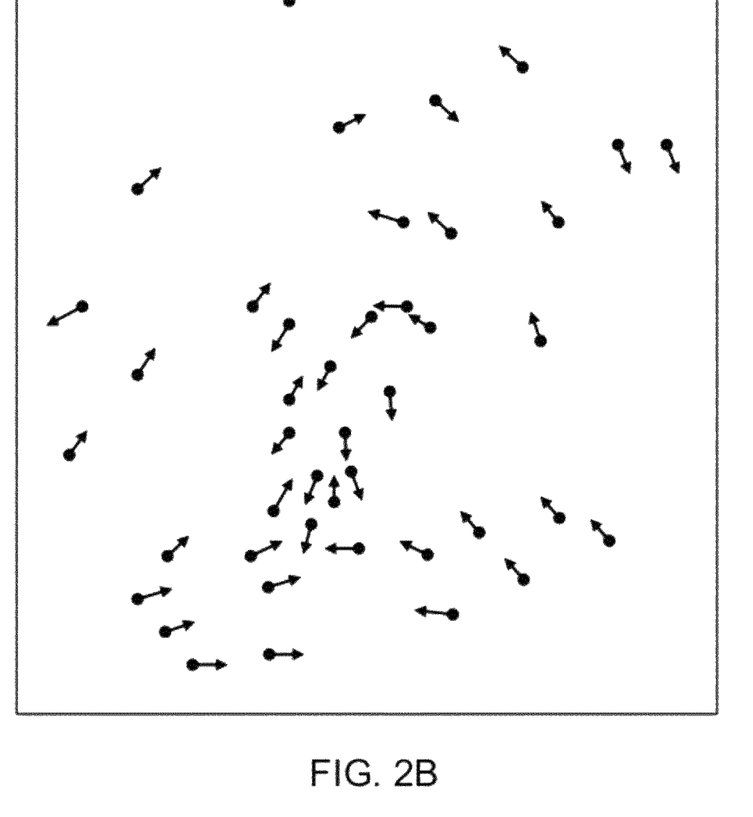
FIG. 2B is an explanatory diagram of practicing a fingerprint feature identification method according to another embodiment, which illustrates feature points on a fingerprint.
Figure 2C:
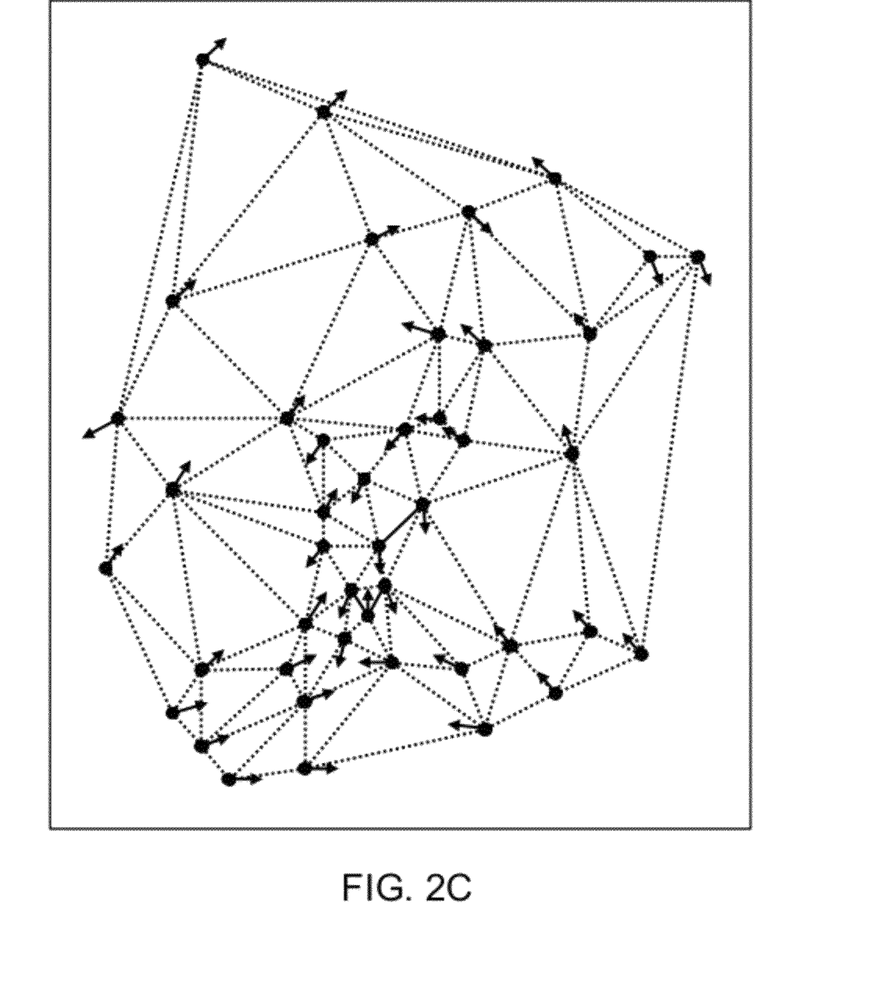
FIG. 2C is an explanatory diagram of practicing a fingerprint feature identification method according to another embodiment, which illustrates multiple feature triangles established according to the feature points shown in FIG. 2B.

Please jointly refer to FIGS. 2A, 2B and 2C. FIG. 2A is an image processed by a fingerprint feature identification method according to another embodiment; FIG. 2B is an explanatory diagram of practicing a fingerprint feature identification method according to another embodiment, which illustrates feature points on a fingerprint; and FIG. 2C is an explanatory diagram of practicing a fingerprint feature identification method according to another embodiment, which illustrates multiple feature triangles established according to the feature points shown in FIG. 2B.

As shown in FIG. 2A, a sample fingerprint 500 (e.g. a digital fingerprint image) retrieved through a scanning process has many fingerprint features thereon (not all marked with numerals), including Terminations, Bifurcations, Lakes, Independent Ridges, Islands, Spurs, Crossovers and etc. Each of these fingerprint features includes at least a feature point. According to the fingerprint feature identification method in the present embodiment, multiple feature points of the fingerprint features on sample fingerprint 500, such as feature points 511~515 (not all marked because of too many points; please refer to FIG. 2B), are determined and used to establish feature triangles.

FIG. 2B shows the feature points determined on sample fingerprint 500 according to the fingerprint feature identification method. Each of the points accompanying with a directed line segment is a feature point in a fingerprint feature of the sample fingerprint 500. The direction of the directed line segment is defined as a "feature point direction", which is relevant with the fingerprint flow of the feature point. In some embodiments, the determined feature points are Standard Feature Points, such as Ridge Termination Points and Ridge Bifurcation Points; in other embodiments, various types of feature points may be selected and retrieved. Basically any point used in any known fingerprint identification method, or any point defined by industrial standards like ISO 19794-2, as long as operable and practicable, may be included in the group of feature points for the fingerprint feature identification method.

The fingerprint feature identification method may be realized by computer performable procedures, operable through a processing unit (e.g. a central processing unit or microprocessor of a computing system) and a database. To provide the user with the current processing status, the fingerprint feature processing method may further include a step of "displaying the retrieved feature points and the feature point directions thereof". One of displaying method is to display through a display unit (e.g. flat panel displays; Liquid Crystal Displays; Organic Electroluminescence Displays); the feature points and the feature point directions thereof may be independently displayed, or displayed together with the fingerprint (image). When the feature points and the feature point directions thereof are displayed together with the sample fingerprint 500, the relative positions in between may be easily identified on the display unit.

Based on the feature points in FIG. 2B, various combinations of different feature triangles may be established. During the process of "Triangulation", to obtain the fewest feature triangles, a method called "Delaunay Triangulation" may be used to establish feature triangles. FIG. 2C is the results of processing the feature points in FIG. 2B through Delaunay Triangulation. In FIG. 2C, every dotted line is a side of a feature triangle; the three vertexes of every feature triangle are all feature points, each having an accompanying "feature point direction".

To provide the user with the current processing status, the fingerprint feature processing method may further include a step of "displaying the established feature triangles". The displaying method may be realized through the display unit mentioned above. The established feature triangles may be independently displayed, or displayed together with the feature points and the feature point directions. These feature triangles may be displayed together with the sample fingerprint 500; or the feature triangles may be displayed together with the feature points, the feature point directions and sample fingerprint 500.

Step 120: Respectively calculate multiple geometric data on each of the feature triangles.

Each of the feature triangles includes multiple geometric data; possible geometric data at least includes: (1) three side lengths of the three sides in every feature triangle; (2) an angle between two feature point directions of the two feature points at the two ends of every side; (3) a "coordinate angle" corresponding to the longest side.

Figure 3A:
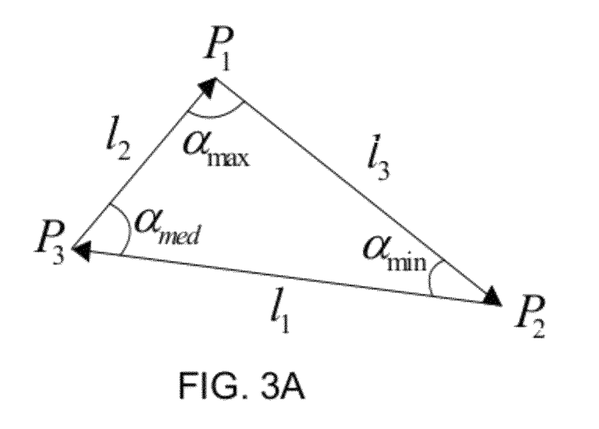
FIG. 3A is an explanatory diagram of a feature triangle established by a fingerprint feature identification method according to another embodiment.
Figure 3B:
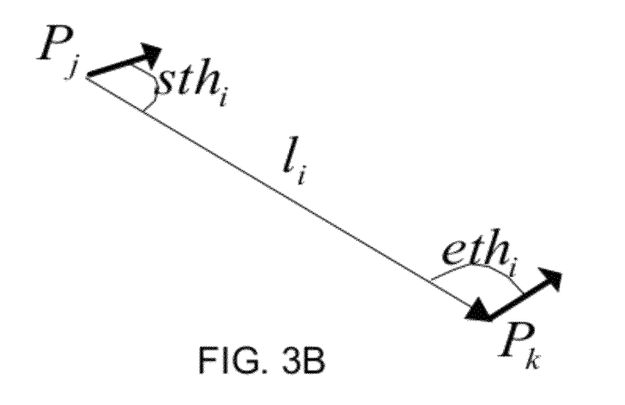
FIG. 3B is an explanatory diagram for any two feature points and a common side thereof within a feature triangle that is established by a fingerprint feature identification method according to another embodiment.
Figure 3C:
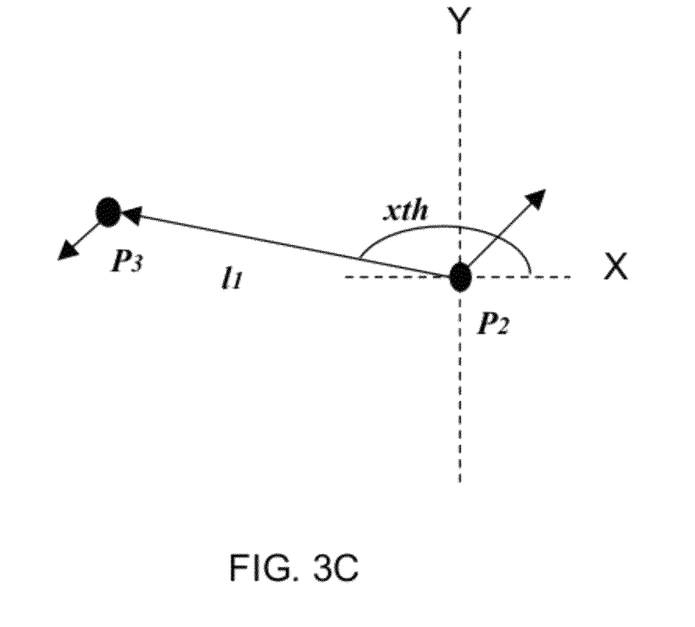
FIG. 3C is an explanatory coordinate diagram for a longest side and a corresponding coordinate angle thereof within a feature triangle that is established by a fingerprint feature identification method according to another embodiment.

Please refer to FIGS. 3A, 3B and 3C. FIG. 3A is an explanatory diagram of a feature triangle established by a fingerprint feature identification method according to another embodiment; FIG. 3B is an explanatory diagram for any two feature points and a common side thereof within a feature triangle that is established by a fingerprint feature identification method according to another embodiment; FIG. 3C is an explanatory coordinate diagram for a longest side and a corresponding coordinate angle thereof within a feature triangle that is established by a fingerprint feature identification method according to another embodiment;

Various geometric data of a feature triangle are further introduced as follows. The geometric data mentioned in the following sections may be applied to the system and method in the embodiments of the disclosure. For better explanations, some definitions of the geometric data have specific rules, which are not general limitations to the disclosure.

As shown in FIG. 3A, longest side $l_1$ corresponds to first feature point $P_1$ and largest angle $\alpha_{max}$; smallest side $l_3$ corresponds to third feature point $P_3$ and smallest angle $\alpha_{min}$; sub longest side $l_2$ corresponds to second feature point $P_2$ and sub largest $\alpha_{med}$. The above-mentioned three side lengths of the three sides in every feature triangle, are namely the side lengths of longest side $l_1$, smallest side $l_3$ and sub longest side $l_2$. Please note that the feature point directions of first feature point $P_1$, second feature point $P_2$ or third feature point $P_3$, are not the directions of longest side $l_1$, sub longest side $l_2$ or smallest side $l_3$ respectively.

Please refer to FIG. 3B, which shows any two feature points $P_j$, $P_k$ in a feature triangle with a common side $l_i$; wherein angle $sth_i$ is defined as the angle between the feature point direction of feature point $P_j$ and the common side $l_i$, while angle $eth_i$ is defined as the angle between the feature point direction of feature point $P_k$ and the common side $l_i$. Refer to FIG. 3A jointly, first and second feature points $P_1$, $P_2$ defines smallest side $l_3$; second and third feature point $P_2$, $P_3$ defines longest side $l_1$; first and third feature point $P_1$, $P_3$ defines sub longest side $l_2$.

As shown in FIG. 3C, the "coordinate angle" corresponding to the longest side mentioned above, is namely the angle between longest side $l_1$ and X-axis (Y-axis) of a virtual coordinate system (i.e. the two dashed lines crossing each other orthogonally).

All the aforesaid geometric data of each and every feature triangle may be stored in a database, and may also be displayed on a display unit in the format of a list.

Step 130: According to the geometric data, respectively classify the feature triangles into one or more of multiple triangle classifications for fingerprint identification.

Refer to FIGS. 3A, 3B, 3C. According to the geometric data of various feature triangles and different classification rules, all the various feature triangles may be classified into different triangle classifications. For explanation purposes, the following eight examples of triangle classifications are defined and classified through specific rules respectively.

Each and every feature triangle, for example, may only match one of triangle classifications #1 and #2. Similarly, each and every feature triangle may only match one of triangle classifications #3 and #4, one of triangle classifications #5 and #6, one of triangle classifications #7 and #8. In such embodiment, when all the feature triangles are classified, the possible combinations of triangle classifications are 2*2*2*2, totally 16 combinations of triangle classifications; yet such classifications and combinations are not general limitations to the disclosure.

(1) Triangle classification #1: All the feature point directions of three feature points in a feature triangle are clockwise.

Namely the feature point directions of first feature point $P_1$, second feature point $P_2$ and third feature point $P_3$ are all determined as a clockwise direction.

(2) Triangle classification #2: All the feature point directions of three feature points in a feature triangle are counterclockwise.

Namely the feature point directions of first feature point $P_1$, second feature point $P_2$ and third feature point $P_3$ are all determined as a counterclockwise direction.

(3) Triangle classification #3: The feature point directions of the first feature point and third feature point are the same.

Namely, for example, the feature point directions of first feature point $P_1$ and third feature point $P_3$ are determined as the same directions. In actual cases, for example, the angles between the feature point directions of first feature point $P_1$ and third feature point $P_3$ may be used to determine whether the feature point directions are the same. If the angle between the feature point directions of first feature point $P_1$ and third feature point $P_3$ is an acute angle, their feature point directions are the same; such feature triangle may be classified as triangle classification #3.

(4) Triangle classification #4: The feature point directions of the first feature point and third feature point are the opposite.

Namely, for example, the feature point directions of first feature point $P_1$ and third feature point $P_3$ are determined as the opposite directions. In actual cases, for example, the angle between the feature point directions of first feature point $P_1$ and third feature point $P_3$ may be used to determine whether the feature point directions are the opposite. If the angle between the feature point directions of first feature point $P_1$ and third feature point $P_3$ is an obtuse angle, their feature point directions are the opposite; such feature triangle may be classified as triangle classification #4.

(5) Triangle classification #5: The feature point directions of the second feature point and third feature point are the same.

Namely, for example, the feature point directions of second feature point $P_2$ and third feature point $P_3$ are determined as the same directions. In actual cases, for example, the angles between the feature point directions of second feature point $P_2$ and third feature point $P_3$ may be used to determine whether the feature point directions are the same. If the angle between the feature point directions of second feature point $P_2$ and third feature point $P_3$ is an acute angle, their feature point directions are the same; such feature triangle may be classified as triangle classification #5.

(6) Triangle classification #6: The feature point directions of the second feature point and third feature point are the opposite.

Namely, for example, the feature point directions of second feature point $P_2$ and third feature point $P_3$ are determined as the opposite directions. In actual cases, for example, the angle between the feature point directions of second feature point $P_2$ and third feature point $P_3$ may be used to determine whether the feature point directions are the opposite. If the angle between the feature point directions of second feature point $P_2$ and third feature point $P_3$ is an obtuse angle, their feature point directions are the opposite; such feature triangle may be classified as triangle classification #6.

(7) Triangle classification #7: The feature point directions of the first feature point and second feature point are the same.

Namely, for example, the feature point directions of first feature point $P_1$ and second feature point $P_2$ are determined as the same directions. In actual cases, for example, the angles between the feature point directions of first feature point $P_1$ and second feature point $P_2$ may be used to determine whether the feature point directions are the same. If the angle between the feature point directions of first feature point $P_1$ and second feature point $P_2$ is an acute angle, their feature point directions are the same; such feature triangle may be classified as triangle classification #7.

(8) Triangle classification #8: The feature point directions of the first feature point and second feature point are the opposite.

Namely, for example, the feature point directions of first feature point $P_1$ and second feature point $P_2$ are determined as the opposite directions. In actual cases, for example, the angles between the feature point directions of first feature point $P_1$ and second feature point $P_2$ may be used to determine whether the feature point directions are the opposite. If the angle between the feature point directions of first feature point $P_1$ and second feature point $P_2$ is an obtuse angle, their feature point directions are the opposite; such feature triangle may be classified as triangle classification #8.

In some embodiments, the available triangle classifications for the classifying processes are selected from the group consisting of "all the feature point directions of three feature points in a feature triangle are clockwise", "all the feature point directions of three feature points in a feature triangle are counterclockwise", "the feature point directions of a first feature point and third feature point in the feature triangle are the same", "the feature point directions of a first feature point and third feature point in the feature triangle are the opposite", "the feature point directions of a second feature point and third feature point in the feature triangle are the same", "the feature point directions of a second feature point and third feature point in the feature triangle are the opposite", "the feature point directions of a first feature point and second feature point in the feature triangle are the same", "the feature point directions of a first feature point and second feature point in the feature triangle are the opposite" and any combination thereof.

The methods of establishing and classifying feature triangles triangle classification, may be applied to process the filed fingerprints (images) existed in a database, and also new fingerprints (images) for further fingerprint identification. In the present disclosure, the advantage of first classifying the feature triangles and next respectively comparing the corresponding geometric data according to the determined triangle classifications is enhanced identification speed: the disclosure does not directly conduct any conventional low-speed, image-comparing procedures; instead, the disclosure adopts high-speed value-comparison processes of geometric data; in addition the feature triangles are classified in advance and the value comparison of each triangle classification may be performed in parallel, so the identification speed is much faster accordingly. The only section that the disclosed methods use about image identification is "feature point retrieval", which is the most mature and high-speed technology nowadays and is more simpler and faster than retrieving technologies of special features like Delta Points or Core Points.

The following introductions are related to applying the method mentioned above to processing filed fingerprints (images) existing in a database. Please refer to FIG. 4, which is another flow chart of a fingerprint feature identification method according to another embodiment. The method according to the present embodiment mainly includes Steps 210, 220, 230 and 240. These steps are introduced in an example sequence, which is not a general limitation to the disclosure.

Figure 4:
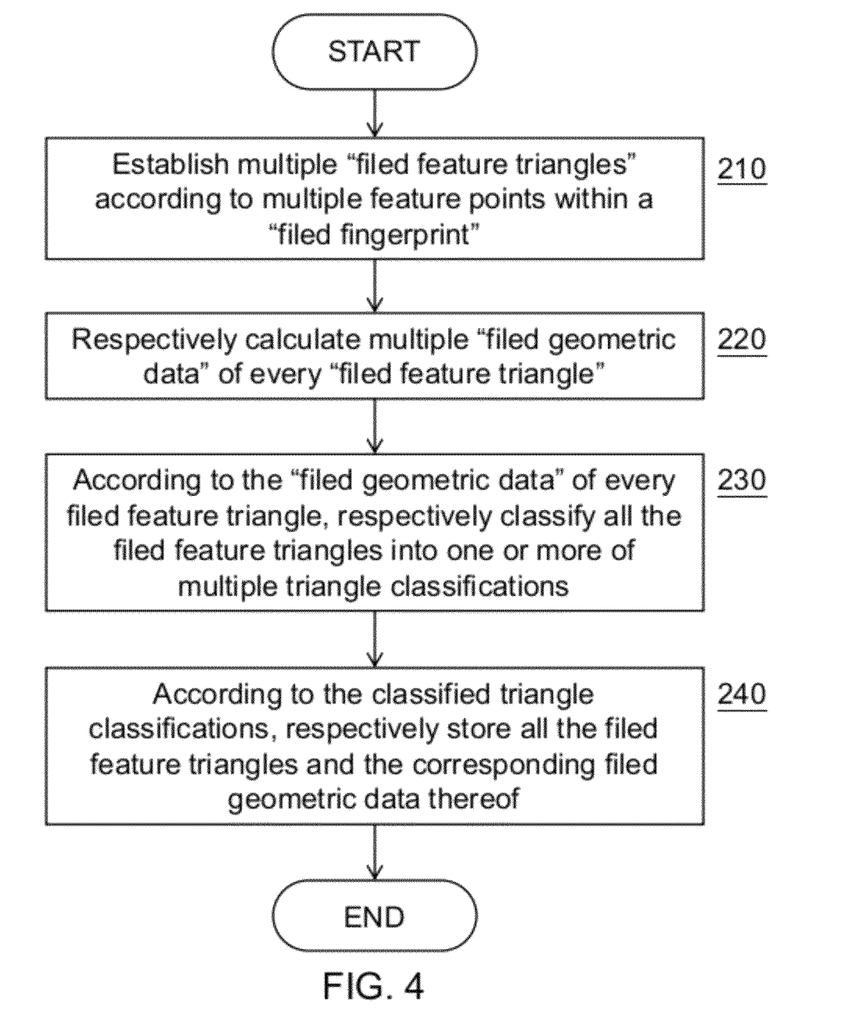
FIG. 4 is another flow chart of a fingerprint feature identification method according to another embodiment.

Step 210: Establish multiple "filed feature triangles" according to multiple feature points within a "filed fingerprint". The "filed fingerprint" is one of those fingerprints (images) stored in a database and used as comparison samples; while the "filed feature triangles" are the feature triangles established according to the feature points within the "filed fingerprint". Other explanations about Step 210 are similar to Step 110 and are omitted here.

Step 220: Respectively calculate multiple "filed geometric data" of every "filed feature triangle". Other introductions of Step 220 are similar to Step 110 and are omitted here.

Step 230: According to the "filed geometric data" of every filed feature triangle, respectively classify all the filed feature triangles into one or more of multiple triangle classifications. The other introductions of Step 230 are similar to Step 110 and are omitted here.

Step 240: According to the classified triangle classifications, respectively store all the filed feature triangles and the corresponding filed geometric data thereof. For example, according to the eight triangle classifications #1~#8 mentioned above, respectively store all the filed feature triangles (each classified into one of the eight triangle classifications #1~#8) and the corresponding filed geometric data thereof. Therefore, during identification processes for a new fingerprint (image), all the filed feature triangles and the corresponding filed geometric data thereof within each and every filed fingerprint in the database may be fast accessed.

In order to accelerate the data access speed and comparison speed, another step may be further applied: "Rank the filed feature triangles classified in a same triangle classification according to the side length of the longest side (e.g. the longest side $l_1$ as shown in FIG. 2A) of every filed feature triangle".

The following introductions are related to applying the method mentioned above to processing a retrieved new fingerprint (image). Please refer to FIG. 5, which is another flow chart of a fingerprint feature identification method according to another embodiment. The method according to the present embodiment mainly includes Steps 310, 320, 330 and 340. These steps are introduced in an example sequence, which is not a general limitation to the disclosure.

Figure 5:
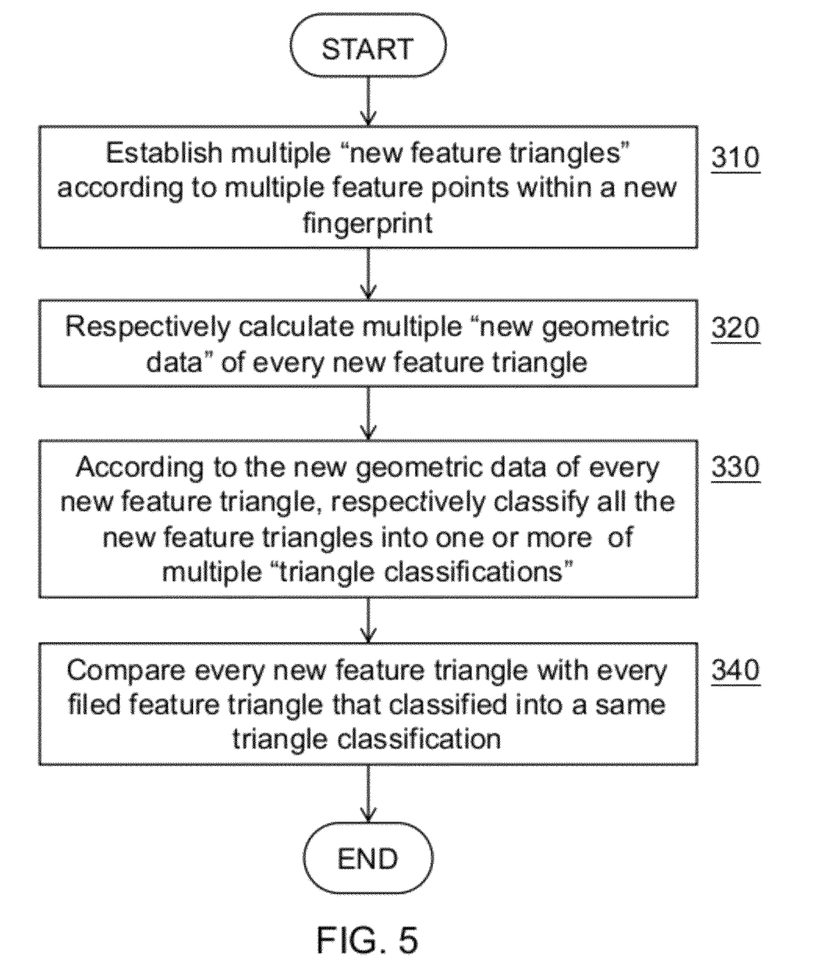
FIG. 5 is another flow chart of a fingerprint feature identification method according to another embodiment.

Step 310: Establish multiple "new feature triangles" according to multiple feature points within a new fingerprint (image). The "new fingerprint" is an unknown fingerprint (image) retrieved for further identification; while the "new feature triangles" are the feature triangles established according to the feature points within the "new fingerprint". The other introductions of Step 310 are similar to Step 110 and are omitted here.

Step 320: Respectively calculate multiple "new geometric data" of every new feature triangle. The other introductions of Step 320 are similar to Step 120 and are omitted here.

Step 330: According to the new geometric data of every new feature triangle, respectively classify all the new feature triangles into multiple "triangle classifications". The other introductions of Step 320 are similar to Step 130 and are omitted here.

Step 340: Compare every new feature triangle with every filed feature triangle that classified into a same triangle classification. For example, according to the eight triangle classifications #1~#8, respectively compare the new feature triangle with the filed feature triangle(s) classified into a same one among triangle classifications #1~#8. During comparison processes, the "new geometric data" of the new feature triangle and the "filed geometric data" of the filed feature triangle(s) are compared to accelerate the comparison speed. Therefore, during identification processes for a new fingerprint (image), all the filed feature triangles and the corresponding filed geometric data thereof within each and every filed fingerprint in the database may be fast accessed.

In a complete comparison procedure, all the filed fingerprints and the triangle classifications existing in the database may be used to compare with the new fingerprint. If part of the new fingerprint is known, only those filed fingerprints of certain fewer triangle classifications may be used for comparison, which also accelerates the comparison speed. Similarly, in a standard comparison procedure, all the triangle classifications may be reviewed and checked to obtain precise results. However, to accelerate the comparison speed, during comparing the new fingerprint and the filed fingerprint, only certain ones of the new geometric data and the filed geometric data regarding specific selected triangle classifications (e.g. those triangle classifications selected by a system administrator, or some classified triangle classifications for the new/filed fingerprints) are compared.

To output systematic or digitalized fingerprint identification results, a "hitting score" may be assigned respectively by comparison results of all the feature triangles within the new fingerprint. For example, if a difference value of every comparison result is respectively obtained, a "difference-scoring corresponding table" may be established to give hitting scores to various difference values of all the comparison results. During comparison processes of a new fingerprint, the hitting scores of comparing with every filed feature triangle in every filed fingerprint may be further summed and the filed fingerprints may be ranked by hitting scores, such that related information of certain filed fingerprints with highest hitting scores may be output as fingerprint identification results. Therefore, according to the processes mentioned above, the method of fingerprint feature identification may further includes: "Score hitting scores according to difference values of comparison results of each filed feature triangle and sum to determine multiple filed fingerprints with higher hitting scores".

Furthermore, when a fingerprint (image) is retrieved and input into any system, a common problem is the "rotation angle", namely the random, rotated angle of a fingerprint (image) defined by the process of retrieving an duplicate image from an actual fingerprint on a human finger. Even the fingerprints of the same human finger may have different rotation angles during different retrieval processes. Such rotation angle becomes a problem during comparison procedures between new fingerprint and filed fingerprints. Therefore, one or more "rotation-angle similarity array" may be produced in advance; "rotation-angle similarity array" may at least include a reference table of "difference values of feature triangles" and "corresponding comparison scores" under different rotation angles. After comparing with the new feature triangles of the new fingerprint, the aforesaid difference values of filed feature triangles may be recorded into this rotation-angle similarity array to determine a highest score as the comparison score of the filed feature triangle. The filed fingerprints may be ranked according to the comparison scores of their feature triangles and to determine the most possible filed fingerprints with the higher scores. Therefore, the method according to the present embodiment may further include: "Record difference values of each filed feature triangle into rotation-angle similarity array(s), to determine several possible filed fingerprints with the higher comparison scores".

Figure 6:
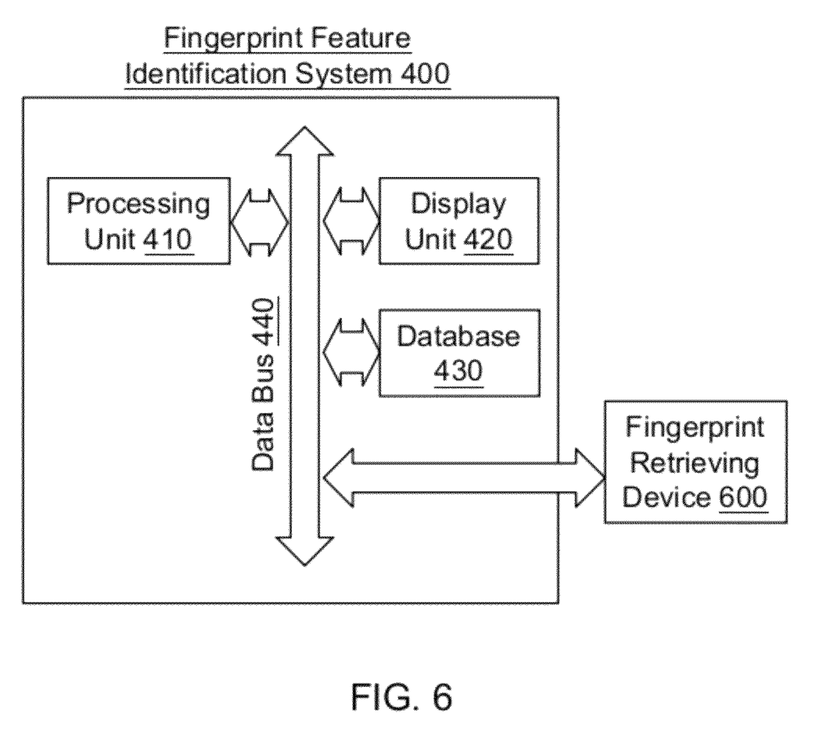
FIG. 6 is a system block diagram of a fingerprint feature identification system according to another embodiment.

FIG. 6 is a system block diagram of a fingerprint feature identification system according to another embodiment. Fingerprint feature identification system 400 performs the fingerprint feature identification method(s) in previous embodiments, which mainly includes a processing unit 410, a display unit 420, a database 430 and data buses 440. A new fingerprint (image) may be retrieved and input from an external (or embedded) fingerprint retrieving device 600 to fingerprint feature identification system 400. Data buses 440 electrical connects with processing unit 410, database 430 and display unit 420 for in-between data transmissions.

Processing unit 410 is operable to perform basic arithmetical, logical, and input/output operations of fingerprint feature identification system 400. In some embodiments, processing unit 410 may be realized by an integrated circuit, also known as CPU (Central Processing Unit), microprocessor, IC or chip. Processing unit 410 is mainly used to perform certain computer-operable procedures as shown in the steps of FIGS. 1, 4 and 5 and any other fingerprint processing steps. According to multiple feature points within a fingerprint, processing unit 410 establishes multiple feature triangle, respectively calculates multiple geometric data of each feature triangle; and then according to the geometric data of each feature triangle, processing unit 410 respectively classify all the feature triangles of the fingerprint into one or more of multiple triangle classifications, such as the above-mentioned triangle classifications #1~#8.

Display unit 420 is in circuit connection or electrically connected with and controlled by processing unit 410, which may be realized by flat panel displays, Liquid Crystal Displays, or Organic Electroluminescence Displays. Display unit 420 displays the corresponding processing screens regarding to the fingerprint (image) and the corresponding fingerprint features, such as the above-mentioned feature points, feature triangles, images of new fingerprint and filed fingerprints, geometric data of new fingerprint and filed fingerprints, information of triangle classifications, comparison results between new fingerprint and filed fingerprints, the difference-scoring corresponding table and/or the rotation-angle similarity array and etc.

Database 430 stores fingerprint images, feature points, feature triangles, geometric data and comparison results of new fingerprint and filed fingerprints, difference-scoring corresponding table(s) and/or rotation-angle similarity array(s) and etc.; these information sets related to fingerprints are accessible by processing unit 400. The database mentioned in the system and method according to the embodiments in this disclosure is used to store digital format information, data or software programs (applications or firmwares), and may be realized by any type of storage unit. Such database may electrical connect with processing units (such as processors or CPUs) of any linked computer through data buses/circuits, data connectors and/or data cables and etc., so that the present system may access the information stored in the database. The storage units, namely the actual form of the database, may include or be realized by volatile or non-volatile computer memories. Examples of volatile computer memory include random access memory (RAM), dynamic random access memory (DRAM), static random access memory (SRAM), solid-state disk (SSD) and etc. Examples of non-volatile computer memory include read-only memory (ROM), flash memory, ferroelectric RAM, most types of magnetic computer storage devices (e.g. hard disks, floppy disks, and magnetic tape), optical discs and etc. In some embodiments, database 430 is operable as a system memory dedicated for processing unit 410 to perform computing tasks, or operable as an internal or external, local or online (on any private/public networks or the internet) storage device accessible by the system 400.

The above-mentioned methods and system regarding to establishing and classifying feature triangles triangle classification, may be applied to process the filed fingerprints (images) existed in a database, and also new fingerprints (images) for further fingerprint identification. In this disclosure, the advantage of first classifying the feature triangles and next respectively comparing the corresponding geometric data according to the determined triangle classifications is to obtain an enhanced identification speed. The disclosure does not directly conduct any conventional low-speed, direct image-comparing procedures; instead, the disclosure adopts high-speed value-comparison processes of geometric data; in addition the feature triangles are classified in advance and the value comparison of each triangle classification may be performed in parallel, so the identification speed is much faster accordingly. The only section that the disclosed methods use about image identification is "feature point retrieval", which is the most mature and high-speed technology nowadays and is more simpler and faster than retrieving technologies of special features like Delta Points or Core Points.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A fingerprint feature identification method, comprising:
   establishing a plurality of feature triangles according to a plurality of feature points on a fingerprint;
   respectively calculating a plurality of geometric data on each of the feature triangles;
   according to a relative direction between any two feature points among the geometric data on each of the feature triangles, alternatively classifying each of the feature triangles into one of each of at least one pair of triangle classifications, wherein two triangle classifications in the same pair of triangle classifications are the same item and opposite results; and
   storing the feature points, the feature triangles and the geometric data of each of the feature triangles and the corresponding triangle classification of each of the feature triangles in a database for fingerprint identification by doing with the same triangle classification.

2. The method according to claim 1, wherein the feature points are selected from the group consisting of ridge termination point and ridge bifurcation point and any combination thereof.

3. The method according to claim 1, wherein the feature triangles are established through Delaunay Triangulation.

4. The method according to claim 1, wherein the geometric data of the feature triangle are selected from the group consisting of "three side lengths of three sides in the feature triangle", "an angle between two feature point directions of the two feature points at the two ends of each of the three sides in the feature triangle", and "a coordinate angle corresponding to a longest side of the feature triangle" and any combination thereof.

5. The method according to claim 1, wherein the two triangle classifications in the same pair of the triangle classifications are "the feature point directions of a first feature point and a third feature point in the feature triangle are the same" and "the feature point directions of the first feature point and the third feature point in the feature triangle are the opposite", "the feature point directions of a second feature point and the third feature point in the feature triangle are the same" and "the feature point directions of the second feature point and the third feature point in the feature triangle are the opposite", or "the feature point directions of the first feature point and the second feature point in the feature triangle are the same" and "the feature point directions of the first feature point and the second feature point in the feature triangle are the opposite".

6. The method according to claim 1 further comprising displaying the feature points of the fingerprint and a feature point direction of each of the feature points on a display unit.

7. The method according to claim 1 further comprising displaying the feature triangles of the fingerprint on a display unit.

8. A fingerprint feature identification method, comprising:
   establishing a plurality of new feature triangles according to a plurality of new feature points within a new fingerprint;
   respectively calculating a plurality of new geometric data of each of the new feature triangles within the new fingerprint;
   according to relative direction between any two feature points among the new geometric data of each of the new feature triangles, alternatively classifying each of the new feature triangles into one of each of at least one pair of triangle classifications, wherein two triangle classifications in the same pair of triangle classifications are the same item and opposite results; and
   respectively comparing the new geometric data of each of the new feature triangles with a plurality of filed geometric data of each of at least a filed feature triangle of each of at least a filed fingerprint among the same triangle classification as the compared new feature triangle in a database.

9. The method according to claim 8, wherein the new geometric data of the new feature triangle and the filed geometric data of the filed feature triangle are selected from the group consisting of "three side lengths of three sides in the new/filed feature triangle", "an angle between two feature point directions of the two feature points at the two ends of each of the three sides in the new/filed feature triangle", and "a coordinate angle corresponding to a longest side of the new/filed feature triangle" and any combination thereof.

10. The method according to claim 8, wherein the two triangle classifications in the same pair of the triangle classifications are "the feature point directions of a first feature point and a third feature point in the feature triangle are the same" and "the feature point directions of the first feature point and the third feature point in the feature triangle are the opposite", "the feature point directions of a second feature point and the third feature point in the feature triangle are the same" and "the feature point directions of the second feature point and the third feature point in the feature triangle are the opposite", or "the feature point directions of the first feature point and the second feature point in the feature triangle are the same" and "the feature point directions of the first feature point and the second feature point in the feature triangle are the opposite" and any combination thereof.

11. The method according to claim 8, wherein the filed feature triangles and the filed geometric data and the corresponding triangle classifications are pre-stored in the database.

12. The method according to claim 11 further comprising ranking the filed feature triangles in the same triangle classification according to a side length of a longest side within each of the filed feature triangles.

13. The method according to claim 8 further comprising displaying the new feature points of the new fingerprint and a feature point direction of each of the new feature points on a display unit.

14. The method according to claim 8 further comprising displaying the new feature triangles of the new fingerprint on a display unit.

15. The method according to claim 8 further comprising scoring hitting scores according to a plurality of difference values of comparison results for each of the filed feature triangles, and summing the hitting scores to determine at least possible one of the filed fingerprints with a higher hitting score.

16. The method according to claim 8 further comprising recording a plurality of difference values of each of the filed feature triangle into at least one rotation-angle similarity array, to determine at least possible one of the filed fingerprints with a higher comparison score.

17. The method according to claim 8, wherein during comparing the new fingerprint and the filed fingerprint, only certain ones of the new geometric data and the filed geometric data regarding the selected ones of the triangle classifications are compared to accelerate a comparison speed.

18. A fingerprint feature identification system, comprising:
a processing unit, establishing a plurality of feature triangles according to a plurality of feature points within a fingerprint, respectively calculating a plurality of geometric data of each of the feature triangles, and alternatively classifying each of the feature triangles of the fingerprint into one of each of at least one pair of triangle classifications according to a relative direction between any two feature points among the geometric data of each of the feature triangles, wherein two triangle classifications in the same pair of triangle classifications are the same item and opposite results;
a database accessible by the processing unit, storing the feature points, the feature triangles and the geometric data of the fingerprint and the corresponding triangle classifications;
a display unit controllable by the processing unit, displaying the feature points, the feature triangles and the geometric data of the fingerprint and the corresponding triangle classifications; and
a plurality of data buses, electrically connecting the processing unit, the database and the display unit for data transmissions thereof.

19. The system according to claim 18, wherein the geometric data of the feature triangle are selected from the group consisting of "three side lengths of three sides in the feature triangle", "an angle between two feature point directions of the two feature points at the two ends of each of the three sides in the feature triangle", and "a coordinate angle corresponding to a longest side of the feature triangle" and any combination thereof.

20. The system according to claim 18, wherein the two triangle classifications in the same pair of the triangle classifications are "the feature point directions of a first feature point and a third feature point in the feature triangle are the same" and "the feature point directions of the first feature point and the third feature point in the feature triangle are the opposite", "the feature point directions of a second feature point and the third feature point in the feature triangle are the same" and "the feature point directions of the second feature point and the third feature point in the feature triangle are the opposite", or "the feature point directions of the first feature point and the second feature point in the feature triangle are the same" and "the feature point directions of the first feature point and the second feature point in the feature triangle are the opposite" and any combination thereof.

\* \* \* \* \*